Feb. 13, 1962 F. P. KEIPER, JR 3,021,435

STABLE OUTPUT PULSE PRODUCING SYSTEM

Filed Jan. 16, 1959

INVENTOR.
FRANCIS P. KEIPER, JR.
BY Fordyce A. Bothwell
ATTORNEY

3,021,435
STABLE OUTPUT PULSE PRODUCING SYSTEM

Francis P. Keiper, Jr., Oreland, Pa., assignor, by mesne assignments, to Philco Corporation, Philadelphia, Pa., a corporation of Delaware
Filed Jan. 16, 1959, Ser. No. 787,231
8 Claims. (Cl. 307—88.5)

This invention relates to monostable systems for producing output pulses in response to input pulses, wherein the duration of the output pulses is determined by the time constant of a resistance-capacitance combination.

In some instances it is desired to produce output pulses of fixed duration or pulse width in response to triggering pulses which may vary in pulse width. For example, it may be desired to energize a load device for a predetermined fixed time interval in response to each triggering pulse applied to the system. However, in prior systems of this type the R-C time constant has tended to be varied by variations in the tube or transistor components with the result that the duration or width of the output pulses has tended to vary. For example, in a monostable multivibrator employing transistors, the R-C time constant tends to be varied by temperature variations and change of characteristics of the transistors. While silicon transistors are substantially immune to temperature variations, the use of such transistors is impractical due to their cost.

The principal object of the present invention is to provide a system wherein the R-C time constant is independent of tube or transistor components and therefore the width of the output pulses is not affected by variations in such components.

A system according to the present invention is novelly characterized in that the time duration or width of the output pulses is controlled by the time constant of the discharge current of an energy-storage capacitor and also by abrupt completion of the discharge when a voltage varying with the discharge reaches a certain value.

Thus a system according to this invention comprises an energy-storage capacitor, means for normally charging said capacitor, a discharge circuit for said capacitor including a resistor which together with the capacitor determines the discharge current characteristic, means for initiating discharge of said capacitor in response to a triggering pulse, and for abruptly terminating the discharge when a voltage varying with the discharge reaches a predetermined value, and means for producing an output pulse in time coincidence with the flow of the discharge current.

As hereinafter described, the preferred embodiment of the invention employs a pair of controllable devices, preferably transistors, of which one is normally turned on and the other is normally turned off. The output pulse is produced by turning off the first device which turns on the second device. The discharge of the storage capacitor is initiated at the same time and takes place independently of said devices.

The invention may be fully understood from the following detailed description with reference to the accompanying drawing wherein—

Figure 1:
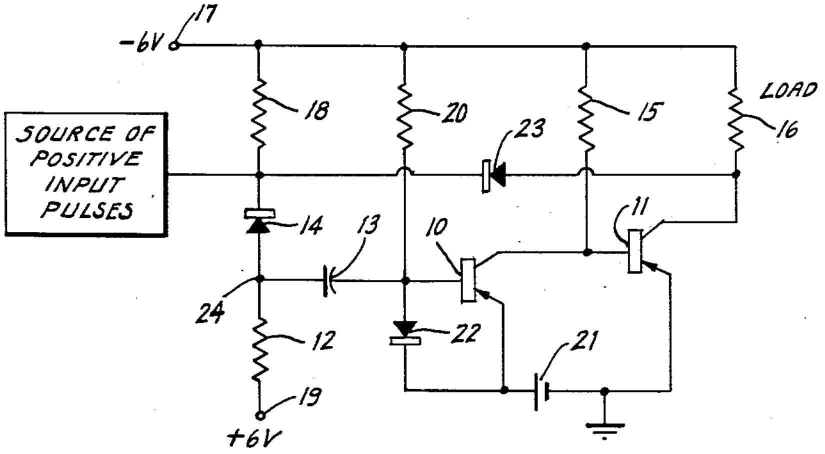
Figure 2:
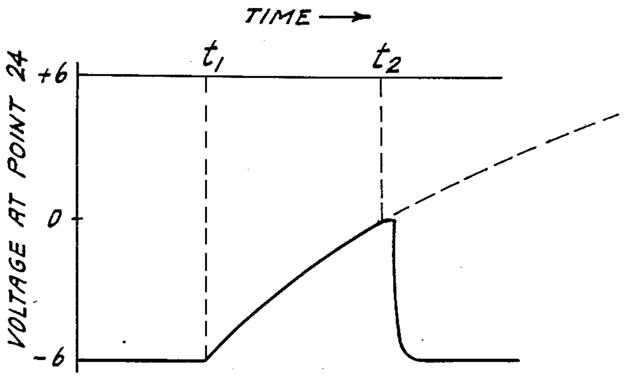

FIG. 1 is a diagrammatic illustration of a preferred embodiment of a system according to this invention; and FIG. 2 is a graphic illustration of the operation.

Referring more particularly to the drawing, the system shown in FIG. 1 comprises a first controllable device 10 and a second controllable device 11 controlled by the first device to produce an output pulse, said devices preferably being germanium transistors, and a resistance-capacitance combination 12, 13 whose discharge current characteristic is instrumental in establishing the time duration or width of the output pulse. Diode 14, which preferably is a silicon diode, serves to initiate the operation and also to terminate discharge of capacitor 13, so that it too is instrumental in establishing the width of the output pulse. In the absence of an input pulse, transistor 10 is turned on to saturation, capacitor 13 is charged, and transistor 11 is turned off. When an input pulse is applied to the diode 14, transistor 10 is turned off and transistor 11 is turned on to saturation to produce an output pulse, and capacitor 13 commences to discharge through resistor 12 independently of the transistors. When the discharge has progressed to a certain point, diode 14 effects abrupt termination of the discharge and causes turn-on of transistor 10 and turn-off of transistor 11 to terminate the output pulse.

Referring more particularly to the detailed circuitry and operation of the embodiment shown, the emitter of transistor 11 is grounded and its base is connected to the junction of the collector of transistor 10 and resistor 15, so that when transistor 10 is turned on transistor 11 is turned off, but when transistor 10 is turned off transistor 11 is turned on to supply an output pulse to the load 16 which is represented as a resistor.

Diode 14 has its cathode connected to the negative supply terminal 17 through resistor 18, and has its anode connected to the junction of resistor 12 and capacitor 13 and hence to the positive supply terminal 19 through resistor 12. Capacitor 13 is connected to the base of transistor 10, and a resistor 20 is connected between the negative supply terminal and the junction of capacitor 13 and said base. A small biasing battery 21 is connected to the emitter of transistor 10 to permit transistor 10 to maintain transistor 11 in the cut-off state. A diode 22 is connected in shunt with the base-emitter path of transistor 10 and is poled so as to be normally non-conductive. The cathode of diode 14 is connected to the collector of transistor 11 through a diode 23 which is conductive only in the right-hand direction. This diode eases triggering by an input pulse by disconnecting the load from the triggering circuit until triggering takes place. It also prevents triggering by the load circuit transients.

In the absence of an input pulse, diode 14 is conductive and current flows from the negative supply terminal 17 through resistor 18, diode 14 and resistor 12 to the positive supply terminal 19. Transistor 10 is turned on due to current flow from the negative supply terminal through resistor 20, the base-emitter path of transistor 10 and the small biasing battery 21 to ground. Transistor 11 is turned off, so that the load 16 is deenergized. Capacitor 13 is charged through a circuit which extends from the negative supply terminal 17 through resistor 18, diode 14, the base-emitter path of transistor 10, and bias battery 21 to ground. Diode 22 is non-conductive.

When a positive input pulse is applied to the cathode of diode 14 it is biased off, opening the charging circuit of capacitor 13. The current through resistor 20 now flows through capacitor 13 and resistor 12 as the capacitor starts to discharge through resistor 12 to the positive supply, removing the current of resistor 20 from the base-emitter circuit of transistor 10. Diode 22 completes the discharge loop for the capacitor 13. Transistor 10 is turned off and transistor 11 is turned on to initiate an output current pulse through load 16. The cathode of diode 14 is pulled to ground through diode 23 and the collector-emitter path of transistor 11.

The voltage at point 24 varies with the discharge and when it reaches approximately zero diode 14 conducts, causing an abrupt decrease of the capacitor discharge current to zero. Transistor 10 is again biased on by current flowing through resistor 20 and the base-emitter path. Transistor 11 is turned off, terminating the output pulse and opening diode 23. Capacitor 13 is again recharged through resistor 18 and diode 14, and the system is ready for the next input pulse.

From the foregoing description it will be seen that the duration or width of the output pulse is determined by the discharge current characteristic as established by the R-C time constant, and also by the abrupt termination of the discharge by diode 14. Moreover, it will be seen that the discharge is essentially independent of the transistors, and therefore the width of the output pulse is not affected by variations such as temperature changes.

FIG. 2 graphically depicts the operation. It is assumed that a triggering pulse turns off diode 14 at time $t_1$ to initiate an output pulse as above described. The discharge current decreases exponentially according to the R-C time constant, and the voltage at point 24 rises accordingly. At time $t_2$ this voltage reaches zero and diode 14 again conducts and abruptly terminates the discharge, causing turn-on of transistor 10 and turn-off of transistor 11 to terminate the output pulse. Capacitor 13 is quickly recharged and the voltage at point 24 returns to its normal value.

In one physical embodiment of the illustrated system which was employed to operate a solenoid valve, the circuit components and their values were as follows:

Transistor 10—2N224
Transistor 11—2N352 or 2N224
Resistor 12—15K
Capacitor 13—16 microfarads
Diode 14—Transitron S4G silicon diode
Resistor 15—1K
Load 16—33 ohms
Resistor 18—150 ohms
Resistor 20—39K While a preferred embodiment of the invention has been illustrated and described, it is to be understood that the invention is not limited thereto but contemplates such modifications and other embodiments as may occur to those skilled in the art. For example, it is possible to eliminate resistor 18 and diode 23, in which case current insufficient to operate the load normally would flow through the load to the diode 14 instead of through resistor 18. However, the arrangement shown including diode 23 has the advantages hereinbefore mentioned.

I claim:

1. In a system for producing output pulses of fixed duration in response to triggering pulses, a first controllable normally-operative device, a second controllable normally-inoperative device having its input connected to the output of said first device so as to be rendered operative to produce an output pulse when said first device is rendered inoperative, a normally-charged energy-storage capacitor connected to said first device so as to render the latter inoperative coincidentally with discharge of the capacitor, a discharge circuit for said capacitor independent of said devices, said circuit including said capacitor and a resistor whose time constant determine the discharge current characteristic, and means for initiating discharge of said capacitor in response to a triggering pulse, and for abruptly terminating the discharge when the voltage at the junction of said capacitor and said resistor reaches a predetermined value, whereby to produce an output pulse in time coincidence with the flow of discharge current.

2. A system according to claim 1, wherein said devices are transistors.

3. A system according to claim 1, wherein said means for initiating and terminating the discharge includes a normally-conductive diode connected to said junction and arranged to be rendered non-conductive by a triggering pulse and to be rendered conductive by said voltage.

4. In a system for producing output pulses of fixed duration in response to triggering pulses, a first transistor, means normally rendering said transistor conductive, a second transistor connected to said first transistor so as to be normally rendered non-conductive and to be rendered conductive to produce an output pulse when said first transistor is rendered non-conductive, an energy-storage capacitor connected to the base of said first transistor so as to render the latter non-conductive coincidentally with discharge of the capacitor, a normally-conductive first diode, a charging circuit for said capacitor including said diode and the base-emitter path of said first transistor, a normally non-conductive second diode connected in shunt with the base-emitter path of said first transistor, a discharge circuit for said capacitor including said second diode, a resistor connected to said first diode and included in said discharge circuit, and means for applying a triggering pulse to said first diode to render it non-conductive and thus initiate discharge of said capacitor and production of an output pulse, said first diode being rendered conductive when the voltage at its junction with said resistor reaches a predetermined value, thereby to abruptly terminate the discharge and to terminate the output pulse.

5. In a system for producing output pulses of fixed duration in response to triggering pulses, a first transistor, means normally rendering said transistor conductive, a second transistor connected to said first transistor so as to be normally rendered non-conductive and to be rendered conductive to produce an output pulse when said first transistor is rendered non-conductive, an energy-storage capacitor connected to the base of said first transistor so as to render the latter non-conductive coincidentally with discharge of the capacitor, a normally-conductive first diode, a charging circuit for said capacitor including said diode and the base-emitter path of said first transistor, a normally non-conductive second diode connected in shunt with the base-emitter path of said first transistor, a discharge circuit for said capacitor including said second diode, a resistor connected to said first diode and included in said discharge circuit, a connection including a normally non-conductive third diode between said first diode and the collector of said second transistor, and means for applying a triggering pulse to said first diode to render it non-conductive and thus initiate discharge of said capacitor and production of an output pulse, said first diode being rendered conductive when the voltage at its junction with said resistor reaches a predetermined value, thereby to abruptly terminate the discharge and to terminate the output pulse.

6. In a system for producing output pulses of fixed duration in response to triggering pulses, negative and positive supply terminals, first and second transistors, means connecting the emitter of the second transistor to a point of reference potential, a load connected between the collector of the second transistor and the negative supply terminal, a biasing source connected between the emitter of the first transistor and said point of reference potential, a resistor having one end connected to the negative supply terminal and the other end connected to the collector of the first transistor and to the base of the second transistor, a first diode having its cathode connected to the negative supply terminal and to the collector of the second transistor, a resistor connected between the anode of said diode and the positive supply terminal, an energy-storage capacitor connected between the base of the first transistor and the junction of said diode and the last-mentioned resistor, a resistor connected between the base of the first transistor and the negative supply terminal, a second diode having its anode and cathode connected respectively to the base and emitter of the first transistor, and means for applying positive input pulses to the cathode of said first diode.

7. In a system for producing output pulses of fixed duration in response to triggering pulses, a first controllable normally-operative device, a second controllable normally-inoperative device having its input connected to the output of said first device so as to be rendered operative to produce an output pulse when said first device is rendered inoperative, a normally-charged energy-storage capacitor connected to said first device so as to render the latter inoperative coincidentally with discharge of the capacitor, a normally-conductive diode, a charging circuit for said capacitor including said diode, a discharge circuit for said capacitor independent of said devices, a resistor connected to said diode and included in said discharge circuit, and means for applying a triggering pulse to said diode to render it non-conductive and thus initiate discharge of said capacitor and production of an output pulse, said diode being rendered conductive when the voltage at its junction with said resistor reaches a predetermined value, thereby to abruptly terminate the discharge and to terminate the output pulse.

8. In a system for producing output pulses of fixed duration in response to triggering pulses, a first transistor, means normally rendering said transistor conductive, a second transistor connected to said first transistor so as to be normally rendered non-conductive and to be rendered conductive to produce an output pulse when said first transistor is rendered non-conductive, an energy-storage capacitor connected to the base of said first transistor so as to render the latter non-conductive coincidentally with discharge of the capacitor, a charging circuit for said capacitor including the base-emitter path of said first transistor, a normally non-conductive diode connected in shunt with the base-emitter path of said first transistor, a discharge circuit for said capacitor including said diode, a resistor connected to said capacitor and included in said discharge circuit, and means for initiating discharge of said capacitor and production of an output pulse, and for terminating the discharge and the output pulse when the voltage at the junction of said capacitor and said resistor reaches a predetermined value.

References Cited in the file of this patent

UNITED STATES PATENTS

| | | |
|---|---|---|
| 2,688,075 | Palmer | Aug. 31, 1954 |
| 2,837,663 | Walz | June 3, 1958 |
| 2,891,174 | Hawkins | June 16, 1959 |
| 2,892,102 | Reuther et al. | June 23, 1959 |
| 2,898,481 | Gahwiler | Aug. 4, 1959 |
| 2,898,557 | Dahlin | Aug. 4, 1959 |